United States Patent [19]

Seki et al.

[11] Patent Number: 5,072,413

[45] Date of Patent: Dec. 10, 1991

[54] MULTIPLE-VIEW HOLE SHAPE DISPLAY METHOD

[75] Inventors: Masaki Seki; Takashi Takegahara, both of Tokyo; Shinya Nakamura, Yamanashi, all of Japan

[73] Assignee: Fanuc Ltd., Minamitsuru, Japan

[21] Appl. No.: 465,202

[22] PCT Filed: Jul. 5, 1989

[86] PCT No.: PCT/JP89/00674
§ 371 Date: Mar. 5, 1990
§ 102(e) Date: Mar. 5, 1990

[87] PCT Pub. No.: WO90/00766
PCT Pub. Date: Jan. 25, 1990

[30] Foreign Application Priority Data

Jul. 6, 1988 [JP] Japan .................. 63-166847

[51] Int. Cl.⁵ .............................. G06F 15/62
[52] U.S. Cl. ................................... 395/127
[58] Field of Search ............ 364/518, 521, 522, 512, 364/474.24, 474.35, 474.36, 917.96 MS File; 340/729

[56] References Cited

U.S. PATENT DOCUMENTS

| 4,791,579 | 12/1988 | Kranitzky | 364/518 |
| 4,875,097 | 10/1989 | Jackson | 340/729 X |
| 4,933,865 | 6/1990 | Yamamoto et al. | 364/518 |
| 5,010,502 | 4/1991 | Diebel et al. | 364/522 |

Primary Examiner—Gary V. Harkcom
Assistant Examiner—Mark K. Zimmerman
Attorney, Agent, or Firm—Staas & Halsey

[57] ABSTRACT

A multiple-view hole shape display method in which the shapes of holes in workpiece are displayed in the form of multiple views on a display screen using hole shape data. Display colors and display patterns for displaying the holes are determined in dependence upon hole depth. In a case where hole shapes overlap one another in a side view or front view, the shapes of shallower holes are displayed preferentially on top of the shapes of deeper holes.

3 Claims, 6 Drawing Sheets

FIG. 5
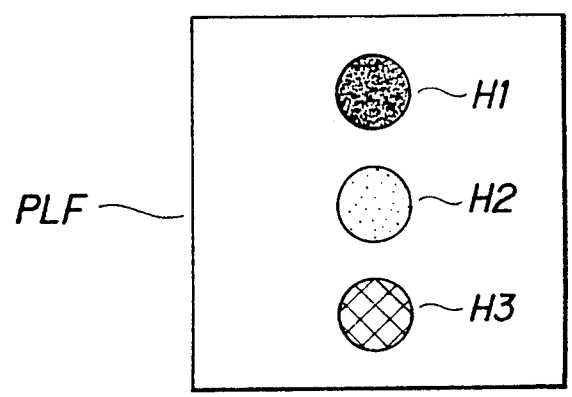
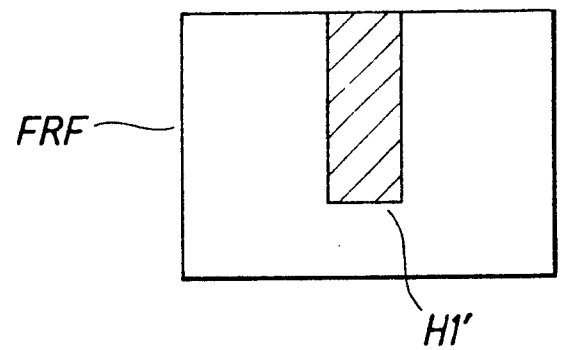

MULTIPLE-VIEW HOLE SHAPE DISPLAY METHOD

DESCRIPTION

1. Technical Field

This invention relates to a multiple-view hole shape display method and, more particularly, to a multiple-view hole shape display method in which the shapes of holes in a part are displayed in the form of multiple views on a display screen using hole shape data.

2. Background Art

In order to check hole shape machining data obtained by automatic programming, there are cases where a part and the shapes of holes therein are displayed in the form of multiple views (e.g., a plan view and side or front perspective projection views) on a display screen using the shape data. In the plan-view display, the shapes of the holes are displayed in display colors and display patterns which differ depending upon differences in hole depth. In the display of a front perspective projection view or a side perspective projection view, hole shapes are displayed in the same color and using the same pattern irrespective of the depths of the holes.

Consequently, as shown in the multiple views of FIG. 5, the shapes of holes H1, H2, H3 in the plan view PLF are displayed in distinguishable form using display colors and display patterns which differ depending upon differences in hole depth. In the front view FRF, however, only a front hole shape H1' of the hole H1 of greatest depth is displayed using a prescribed color and pattern.

In other words, if holes overlap in the conventional front perspective projection view or side perspective projection view, only the front shape or side shape of the deepest hole is displayed. A problem that results is that the relationships among the hole depths cannot be distinguished. Examples of the display patterns are a painted-out pattern, a pattern of slanting lines rising from left to right, a pattern of slanting lines rising from right to left, a cross. hatched pattern and a parallel-line pattern.

Accordingly, an object of the present invention is to provide a multiple-view hole shape display method through which the relationships among hole depths can be distinguished even if the shapes of the holes overlap one another.

DISCLOSURE OF THE INVENTION

The invention provides is a multiple-vew hole shape display method in which the shapes of holes in a part are displayed in the form of multiple views on a display screen using hole shape data. In this multiple-view hole shape display method, the shapes of holes are displayed using display colors and display patterns which differ depending upon hole depth. In a case where hole shapes overlap one another in a side view or front view of the holes, the shapes of shallower holes are displayed preferentially on top of the shapes of deeper hole. By adopting such an arrangement, the relationships among the hole depths can be distinguished with ease.

BRIEF DESCRIPTION OF THE DRAWINGS

FIG. 5 is an explanatory view of an example of the prior art.

BEST MODE FOR CARRYING OUT THE INVENTION

Figure 1:
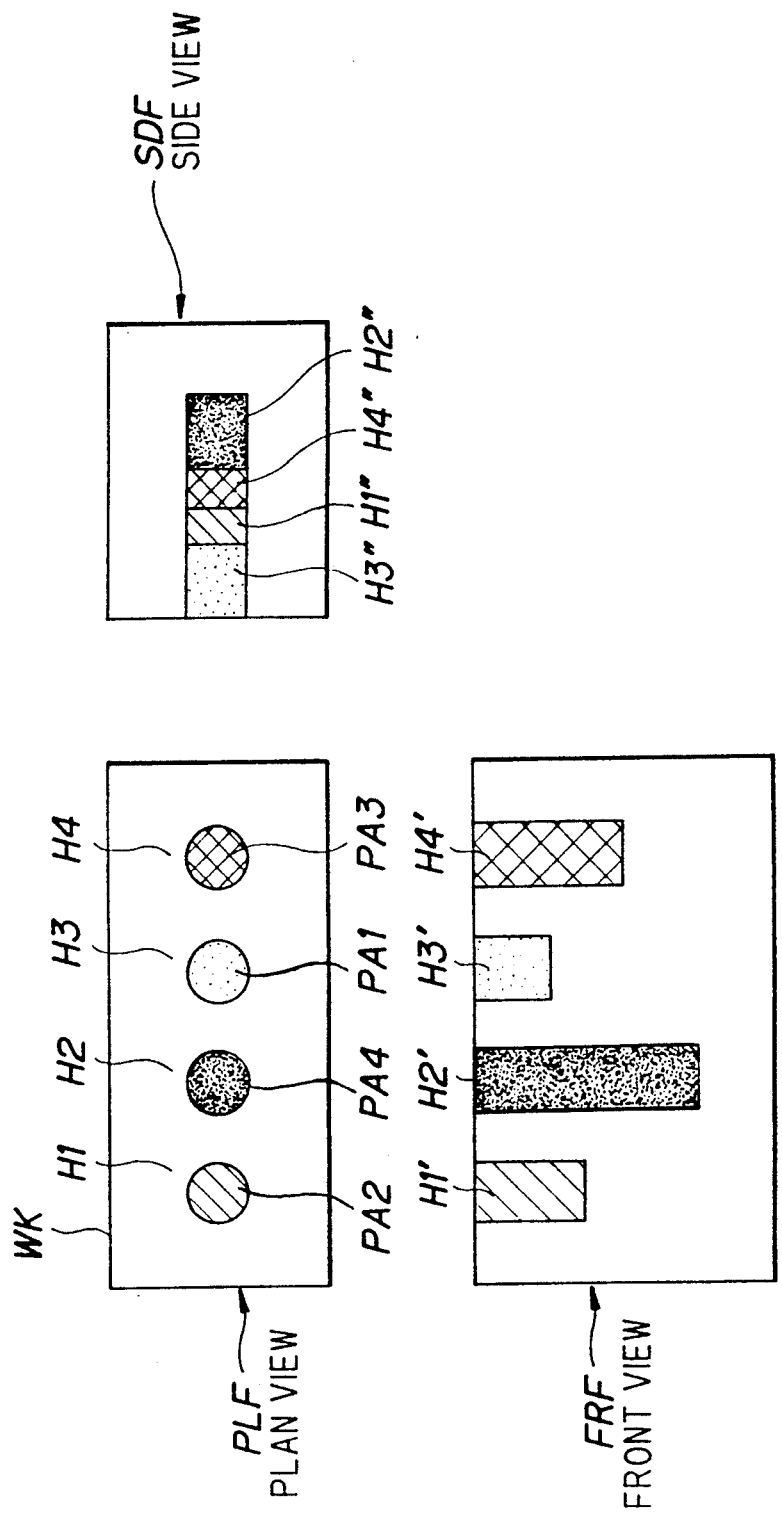
FIG. 1 is a schematic explanatory view of the present invention.

FIG. 1 is a schematic explanatory view of the present invention, in which the reference letters WK represent a workpiece, PLF a plan view, FRF a front view and SDF a side view. The symbol Hi (i=1, 2, ... 4) denotes a plan view of a hole, the symbol Hi denotes a front perspective projection view of a hole, and the symbol Hi" denotes a side perspective projection view of a hole. The symbol PAi represents a display pattern. A perspective projection view is a view in which the contours of holes, grooves and the like in an object are displayed along with the external contour of the object.

In the present invention, the plan views Hi of the holes, the front perspective projection views Hi' of the holes and the side perspective projection views Hi" of the holes are displayed using display colors and display patterns PAi (i=1, 2, ...) which differ depending upon the depths of the holes. For example, in a case where the perspective projection views Hi" (i=1-4) overlap one another in the side view SDF, the shallow hole shapes are displayed preferentially on top of deeper hole shapes. The same is true in a case where the front perspective projection views Hi' overlap one another in the front view FRF.

Figure 2:
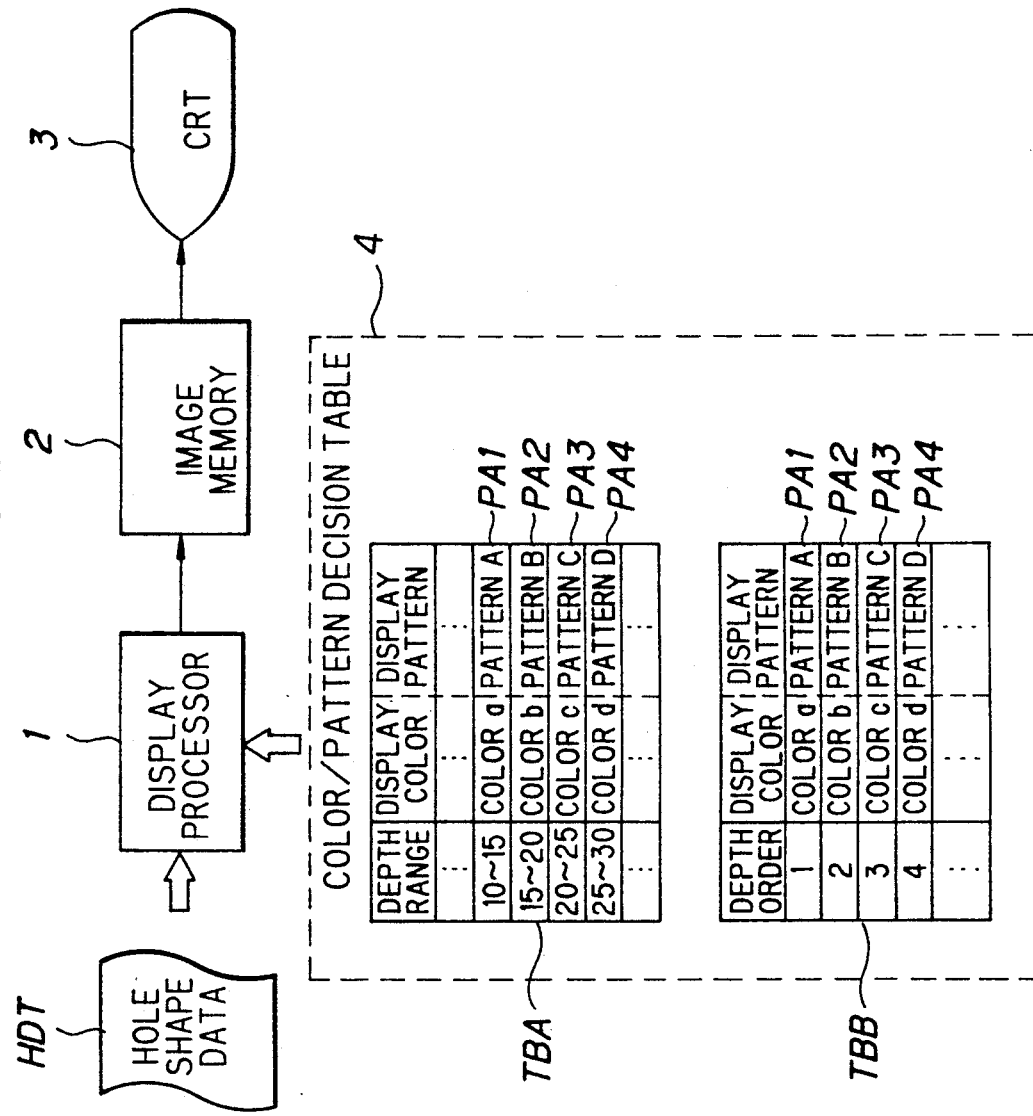
FIG. 2 is a block diagram of a graphic display system according to the present invention.

FIG. 2 is a block diagram of a graphic display system for practicing the multiple-view hole shape display method according to the present invention, in which the numeral 1 denotes a display processor constituted by a microcomputer, 2 denotes an image memory, 3 denotes a cathode-ray tube (CRT), 4 denotes a table for determining display colors and display patterns, and HDT denotes hole shape data. The table 4 for determining display color and display pattern consists of tables TBA, TBB and determines display colors and display patterns PAi (i=1, 2, ...) which differ depending upon the respective hole depths. Either table TBA or TBB is entered in the display processor 1. The table TBA stipulates the correlation between hole depth and the display color and display pattern PAi (i=1, 2, ...). If hole depth has been specified, the display color and display pattern PAi are determined automatically. The table TBB stipulates the correlation between hole depth order and the display color and display pattern PAi (i=1, 2, ...). If hole depth order has been determined starting from the shallower holes, the display color and display pattern PAi are determined automatically.

Figure 3:
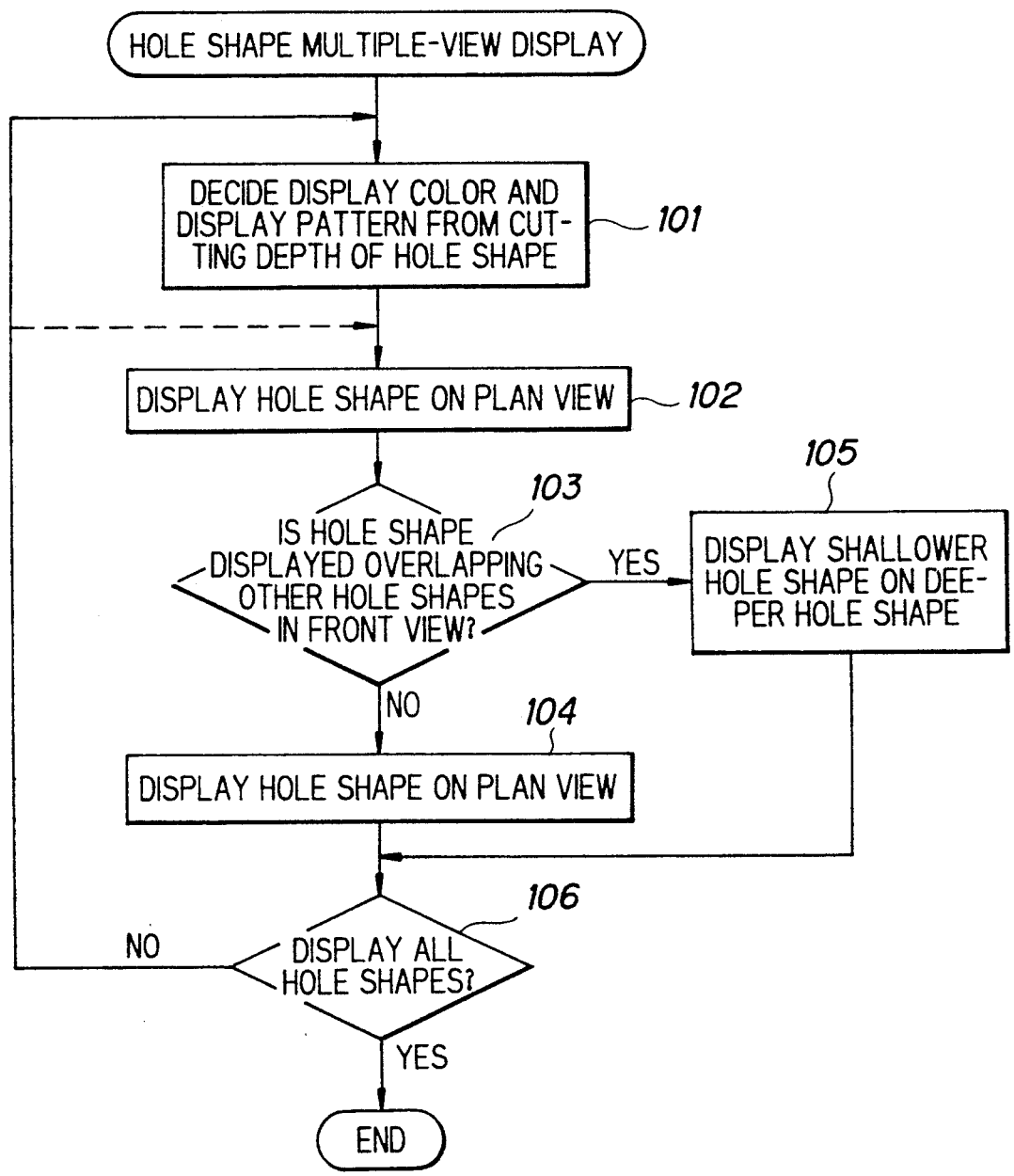
FIG. 3 is a flowchart of processing according to the present invention.
Figure 4A:
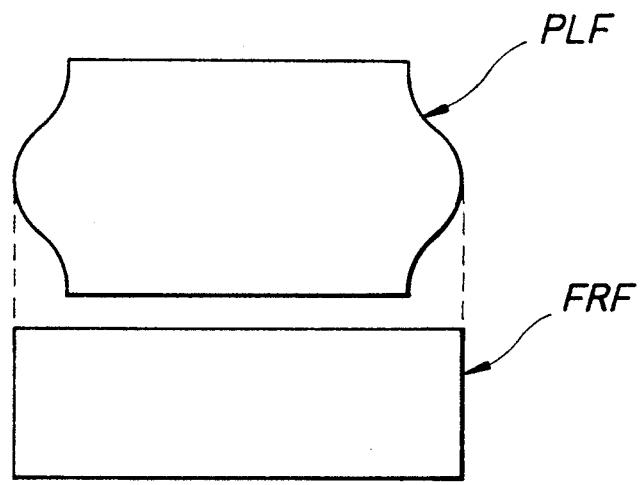
FIGS. 4(a)-(f) are an example of a multiple-view display according to the present invention.

FIG. 3 is a flowchart of the processing of the multiple-view display method in a case where hole shapes are displayed by a plan view and front view. Multiple-view hole shape display processing will now be described in accordance with this flowchart. In addition to ordinary bored holes and drilled the holes displayed pursuant to the invention may, holes include grooves and pockets. Accordingly, the hole shape data HDT is constituted by groove machining shape data, pocket machining shape data and various hole machining shape data. In addition, the hole shape data HDT is created by entering, by means of an automatic programming unit or the like, not shown, shape data indicative of workpiece shape, groove shape and pocket shape and data indicative of hole type, hole diameter, hole depth and hole position. Upon reading the initial data, i.e., the workpiece shape data, from the hole shape data HDT, the display processor 1 creates the plan view PLF and front view FRF of the workpiece WK, stores the views in the image memory 2 and displays them on the CRT 3 [FIG. 4(a)].

Thereafter, the groove shape data, which is the next item of shape data, is read from the hole shape data HDT, and the display color and display pattern are determined from the depths of the groove shape using the table TBA (step 101).

Next, a plan view of the groove is created based on the display color and display pattern determined at step 101, and this is displayed in a form which is superimposed on the plan view PLF of the part (step 102).

Figure 4B:
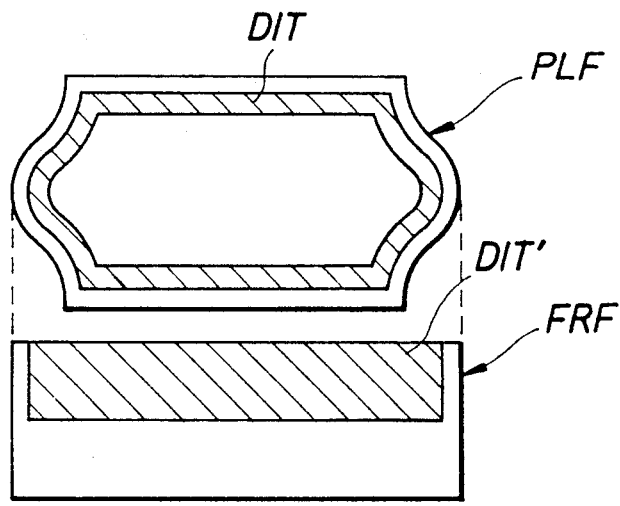

A front perspective projection view of the groove is created and displayed in a form that is superimposed on the front view of the part. More specifically, it is determined whether the abovementioned groove shape overlaps other hole, groove or pocket shapes already displayed on the front view (step 103). If there is no such overlap, the front perspective projection view of the groove is generated based on the color and display pattern determined at step 101, and this is displayed in a form that is superimposed on the front view FRF of the part (step 104). Since overlapping does not occur in the illustrated example, a front perspective projection view DIT' of the groove shape is generated based on the color and display pattern determined at step 101 and this is displayed in a form that is superimposed on the front view FRF of the part, as shown in FIG. 4(b).

Next, it is determined whether all groove, pocket and hole shapes contained in the hole shape data HDT have been displayed (step 106). If all have not been displayed, the processing from step 101 onward is repeated with respect to all shape data. If all shapes have been displayed, hole shape multiple-view display processing is terminated.

In the case where all shapes have not been displayed, the next item of shape data, namely the pocket shape data, is read from the hole shape data HDT, and the display color and display pattern are determined using the table TBA (step 101).

Figure 4C:
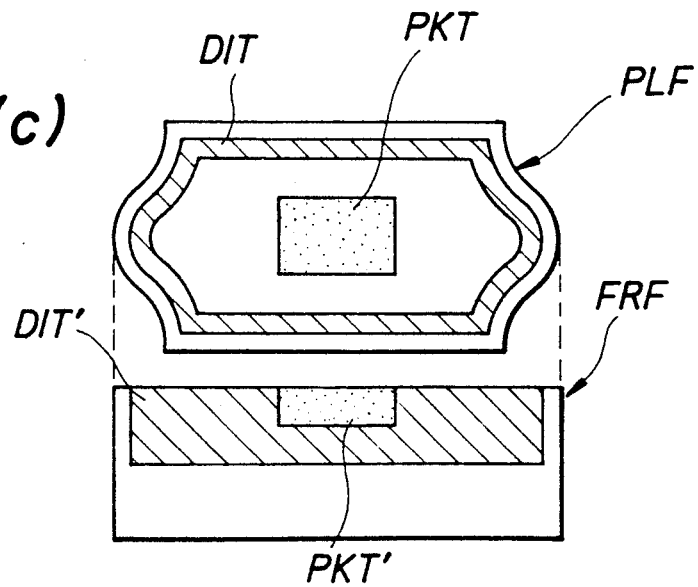

Next, a plan view PKT of the pocket is generated based on the color and pattern determined at step 101 and this is displayed in a form that is superimposed on the plan view PLF of the part (step 102). A front perspective projection view PKT' is then generated and this is also displayed in a form that is superimposed on the front view FRF of the part. More specifically, in displaying the front perspective projection view PKT', it is determined whether the pocket shape overlaps other groove, pocket or hole shapes already being displayed (step 103). If overlapping does occur, the shallower hole shapes are displayed preferentially on top of the deeper hole shapes. For example, in a case where the groove shape DIT' and pocket shape PKT' overlap in the front view of FIG. 4(c), the shallower pocket shape PKT' is displayed preferentially on top of the deeper groove shape DIT' (step 105).

Figure 4D:
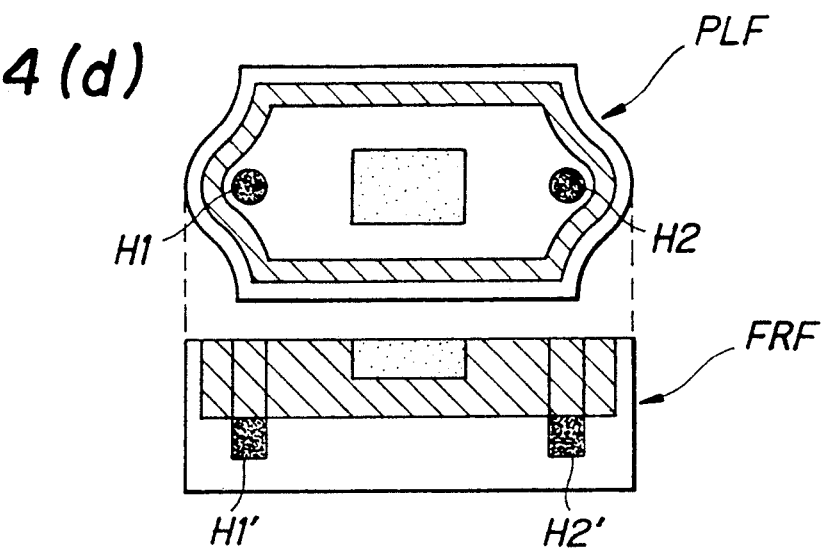
Figure 4E:
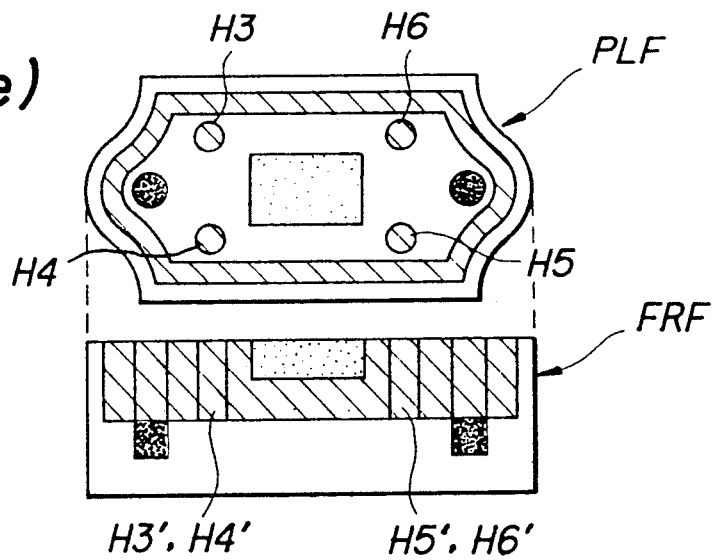
Figure 4F:
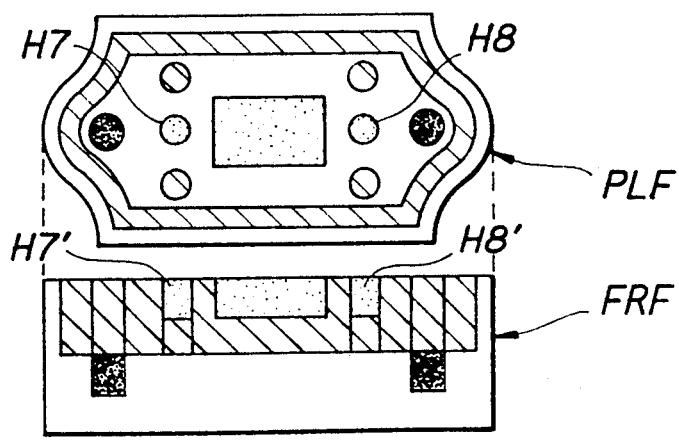

Thereafter, similar processing is performed with regard to holes H1-H8 to display the multiples views [see FIGS. 4(d), (e), (f).]

The case described above is one in which the table TBA is used. A case in which the table TBB is used will now be described.

At step 101 in FIG. 3, the display processor 1 reads all hole depths contained in the hole shape data HDT, stores these depths in order of increasing hole depth, and automatically determines the display colors and display patterns PAi (i=1, 2, . . .) corresponding to the order of the hole shapes using the table TBB. One item of shape data is read from the hole shape data HDT, and the processing from step 102 to step 105 is executed just as in the case of table TBA. If it is found at the decision step 106 that all hole shapes have not been displayed, then processing from step 102 onward is repeated (see the dashed line in FIG. 3). If all hole shapes have been displayed, then multiple-view hole shape display processing is terminated.

In accordance with the present invention, tables are provided for determining display colors and display patterns which differ depending upon the respective hole depths. When multiple views are displayed, the hole shapes are displayed after the display colors and display patterns conforming to the hole depths are determined. In a case where the displayed hole shapes are in a form such that the shapes overlap one another in a front view or side view, the shallower hole shapes are displayed preferentially on top of the deeper hole shapes. As a result, the relationships among hole depths can be recognized even if hole shapes overlap one another.

We claim:

1. A multiple-view hole shape display method using hole shape data for displaying hole shapes of a part on a display screen in the form of multiple views, said method comprising:

providing a table which stipulates a correlation between hole depths and display colors and display patterns;

determining display colors and display patterns of holes, which are specified by the shape data, based on said hole depths using said table;

generating and displaying a plan view of said holes based on said determined display colors and display patterns as well as the hole shape data;

determining whether shapes overlap one another on a side perspective projection view or a front perspective projection view of the holes;

if the hole shapes do not overlap, generating and displaying, on the display screen, the side perspective projection view or front perspective projection view of the holes based on said determined display colors, display patterns and the hole shape data; and if the hole shapes overlap, generating and displaying, on the display screen, the side perspective projection view or front perspective projection view in such a manner that shallower hole shapes are displayed preferentially on top of deeper hole shapes.

2. A multiple-view hole shape display method according to claim 1, wherein said table stipulates a correlation between hole depth dimensions and display colors and display patterns.

3. A multiple-view hole shape display method according to claim 1, wherein said table stipulates a correlation between hole depth ranking and display colors and display patterns.

* * * * *

UNITED STATES PATENT AND TRADEMARK OFFICE
CERTIFICATE OF CORRECTION

PATENT NO. : 5,072,413
DATED : December 10, 1991
INVENTOR(S) : MASAKI SEKI, TAKASHI TAKEGAHARA and SHINYA NAKAMURA It is certified that error appears in the above-identified patent and that said Letters Patent is hereby corrected as shown below:

Column 1, line 42, "cross. hatched" should be

--cross-hatched--.

Column 2, line 60, "the holes displayed" should be

Signed and Sealed this

Twentieth Day of July, 1993

Attest:

MICHAEL K. KIRK

*Attesting Officer*  Acting Commissioner of Patents and Trademarks